United States Patent [19]

Goodman et al.

[11] Patent Number: 4,720,873

[45] Date of Patent: Jan. 19, 1988

[54] SATELLITE AUDIO BROADCASTING SYSTEM

[75] Inventors: Ricky R. Goodman, Monte Vista; Jeffre M. Bobicki, Alamosa, both of Colo.; Robert S. Cherry, Redondo Beach, Calif.

[73] Assignee: Ricky R. Goodman, Tucson, Ariz.

[21] Appl. No.: 777,201

[22] Filed: Sep. 18, 1985

[51] Int. Cl.[4] .................. H04B 17/00; H04H 9/00
[52] U.S. Cl. ............................... 455/2; 455/5; 455/12; 358/84; 370/75; 370/76
[58] Field of Search ............. 455/2, 3, 5, 67, 12; 358/84, 86; 179/2 AS; 370/75, 76

[56] References Cited

U.S. PATENT DOCUMENTS

| | | | |
|---|---|---|---|
| 3,757,225 | 9/1973 | Ulicki | 455/2 |
| 3,919,479 | 11/1975 | Moon et al. | 455/2 |
| 4,025,851 | 5/1977 | Haselwood et al. | 455/2 |
| 4,079,414 | 3/1978 | Sullivan | 455/3 |
| 4,130,801 | 12/1978 | Prygoff | 455/12 |
| 4,230,990 | 10/1980 | Lert, Jr. et al. | 455/2 |
| 4,379,947 | 4/1983 | Warner | 370/76 |
| 4,450,531 | 5/1984 | Kenyon et al. | 455/2 |
| 4,547,804 | 10/1985 | Greenberg | 358/84 |
| 4,566,030 | 1/1986 | Nickeson et al. | 358/84 |

Primary Examiner—Jin F. Ng
Attorney, Agent, or Firm—Thomas M. Freiburger

[57] ABSTRACT

A satellite audio broadcasting system for network programming and broad-based advertising includes a network uplink facility and a plurality of local radio station downlink facilities. The system permits pre-empting of network audio by the local station at any time, but automatically and constantly monitors the local broadcast, comparing it to the network audio, and automatically records any periods of departure. Computers are employed at uplink and downlinks, and from time to time the uplink causes each downlink to transfer to it all data relating to such periods of departure for the subject period of time. Using the data this uplink can automatically compute billing to advertisers and payments to subscriber local stations based on the amount of advertising actually broadcast by the stations. Verification is thereby fully automatic and is substantially tamper-proof. Digital databursts preferably are transmitted via the satellite along with the network audio for separation, decoding and use at the downlink. Such data may contain, for example, a program pre-schedule for the coming day and/or simultaneous identifying information at the time a program or advertising is aired, for downlink logging, and individual accessing codes for network control or communication with specific downlink affiliates.

32 Claims, 9 Drawing Figures

SATELLITE AUDIO BROADCASTING SYSTEM

BACKGROUND OF THE INVENTION

The invention relates to network audio broadcasting, and more particularly to a satellite broadcasting system for network programming and broad-based advertising to be efficiently played over remote affiliate local stations, such as in small communities. The system includes automatic and substantially tamper-proof verification of the advertising actually broadcast by each local station, and automatic billing of advertisers and issuance of payments to the local stations based on this verification.

In radio broadcasting, it is often desirable to broadcast certain programming of broad appeal to a widely scattered audience in different parts of a region or of an entire country of several adjacent countries. For example, taped music of a certain type may appeal to specific audiences which are spread across the nation.

One method of disseminating prepackaged music or other programming over broad geographical areas has been to prepare many copies of tapes or records containing the programming, and to ship the tapes individually to radio stations in scattered locations. In this type of system the tapes or records may be played at times selected by the local stations, so that programming is not simultaneous at different stations. Periodically, each station must obtain additional tapes from the source, for variety of programming.

Another type of system in more recent use has been a broadcast of music programming by satellite, which enables a single uplink broadcasting center to reach a very wide geographical area. Scattered remote local stations can pick up the network audio and play it as they choose in their own local broadcasts. There has been a need in such network satellite audio broadcasting for an efficient system providing for the local broadcast or national or broad-based advertising, such as from national advertisers having stores or outlets throughout the wide geographical area, even in remote local communities. In the past, when broad-based advertising was broadcast by local stations, verification of the actual broadcast of each advertisement was usually addressed by affidavits of the local stations, to the effect that certain advertisements were actually broadcast. Such affidavits have been required by advertising agencies before payment would be released. This has necessitated a considerable amount of paper work and manual record keeping, and it also placed full reliance on the verity of the local station personnel.

There has been a need in the broadcasting industry for a much more efficient system for distributing network audio programming and broad-based advertising over remote local stations, and for verifying the broadcast of advertisements by the local stations, and this is a principal object of the present invention described below.

The following U.S. Patents have some pertinence to the present invention: U.S. Pat. Nos. 2,766,374 (Hoffmann), 3,143,705 (Currey), 3,845,391 (Crosby), 4,025,851 (Haselwood), 4,130,801 (Prygoff), 4,230,990 (Lert), 4,054,753 (Kaul), 3,124,749 (Craig), 3,838,221 (Schmidt), 3,710,027 (Herter) 4,245,341 (Hutton), and 3,982,075 (Jefferis). Some of the systems of these patents were concerned with monitoring radio or television broadcasts to determine whether partiular programming, such as advertising, is being played by a local station. Some used a pattern recognition process alone, and some used coded signals that were recognized by a monitor. Some (e.g., Kaul and Schmidt) included a feature of using databursts for time synchronization in a satellite-linked network, both being TDMA systems (Time Division Multiple Access), which the present invention is not. Others (such as Herter) show addressability of individual stations using databursts. None of the prior patents dislcoses a system with the special features and the degree of automation in broadcast verification, bookkeeping, and general data mangement characteristic of the present invention described below.

SUMMARY OF THE INVENTION

The satellite audio broadcasting system of the invention is capable of reaching remote local stations with pretaped music and advertising, and optionally including live voice, and of verifying completely automatically what advertising has actually been broadcast by the local station, while giving the local station personnel the option to defeat any portion of the network programming desired, for substituting programming of local interest. The local personnel need not keep manual records of network-originated advertising broadcast by the station, since this determination is made automatically and all records are kept automatically and fed automatically to an uplink network base station, where the data is further processed by computer. The system of the invention enables a local station to be virtually attendant-free except for periodic checking for proper equipment function as required by the FCC.

In one form of the invention, a radio communication system for broadcasting network programming and broad-based advertising via satellite and remote local stations includes a network source uplink facility having uplink means for transmitting both audio, including programs and advertising, and coded digital databurst information via communications satellite in geosynchronous orbit. Within the system are a plurality of remote local radio station downlink facilities, each including downlink receiving means for receiving the network transmissions from the satellite, for separating the coded databurst information from the audio, for decoding and presenting some of the databurst information (e.g., prescheduling information) in readable form for a local station operator and otherwise using the databurst information for functions at the downlink, and for presenting the network audio in a form usable in the local station broadcast.

At the local station facility are downlink monitoring means for receiving the network audio and the local station broadcast and for comparing them and determining periods of departure of the local broadcast from the network audio and for generating signals representing said periods of departure. The signals may simply note the time when the local station goes "ON" the network and when it goes "OFF" the network, producing a series of "ON" and "OFF" times. Also included at the local station are downlink computer means and memory means for receiving signals from the downlink monitoring means and for recording in memory information relating to the periods of departure and relating to individual (specific) accessing of the particular station, equipment malfunctions, confirmation of time sync, on/off of network voice, periods when the network is not operational, and any other occurrences of importance at the downlink or at the uplink. A downlink modem means is provided in association with the downlink computer means, for communicating information over telephone lines.

At the network uplink facility are several computer modems for communicating with downlink computers from time to time via the downlink modems and receiving information from the downlink computers, including the information relating to periods of departure. The information is communicated over telephone lines to the uplink data management computer. Data processing means are associated with the uplink computer for computing billing to advertisers and payments to local radio station affiliate (downlink) facilities for local broadcasting of said broad-based network advertising, based on the total network advertising, the information relating to periods of departure relative to each local radio station, and other stored information relating to billing rates, etc.

Preferably, the transmitter means transmits on two carrier frequencies each having 25 KHz bandwidth, with the digital databurst information frequency division multiplexed above audible frequency on one carrier. One carrier has right channel of stereo plus databurst information frequency division multiplexed above the audible frequencies, and the other carrier has left channel of stereo with network voice.

In one form of the system, the uplink computer or data management computer and modems can include means for automatically calling each affiliate downlink computer means from time to time and for causing the affiliate computer means to transfer to the uplink computer the information relating to periods of departure for a selected span of time. The downlink affiliate may also call the uplink data management computer for specific purposes such as trouble at the downlink facility.

The downlink may also call the uplink to transfer its data, rather than the uplink calling the downlink as mentioned above, in response to a specific affiliate access signal sent over the satellite to the downlink, instructing it to make the call and unload data.

Further, the data processing means at the uplink includes means for processing the information relating to periods of departure by comparing it with the times the network broad-based advertising has occurred, to determine to what extent such advertising has been played and omitted by each local station, as part of the computation of billing and payments.

As a further preferred feature, the uplink may include uplink printer means associated with the uplink computer and the data processing means for automatically printing bills to advertisers calculated per total national audience and printing checks in payment to each local radio station for ads played to the station's audience. Payments preferably are correlated to the station's individual audience size.

A feature which is included at each affiliate is a subsystem for utilizing the digital databurst information for cue triggering at the local station. Useage is optional. The databurst information may include timed cue triggers for cuing and providing a triggering signal usable by the affiliate local station for automatically activating replacement local programming audio played on the local station's equipment and selected by the local radio station operator to defeat the network audio. The downlink affiliate electronics include a defeat means and a means for receiving and utilizing the cue triggers to automatically defeat network audio and replace it with the selected local programming at the selected times and for the selected time spans.

Another optional feature of the invention is a means associated with the uplink transmitting means for transmitting a separate carrier frequency and optional "network voice" audio to accompany the network audio, with the downlink affiliate radio station facility including means for receiving this additional audio and enabling the broadcasting of it along with the network audio. The downlink affiliate electronics will then include a defeat switch for permitting the local radio station operator to defeat the optional "network voice" audio whenever desired, which may be simply by manually switching it off.

It is therefore among the objects of the invention to provide a unique and fully automated satellite audio broadcasting system which enables the efficient broadcast of network audio programming and advertising from a single network uplink source via remote and scattered local stations. A major object of the invention is the automatic verification of advertisement broadcasting by each individual local station, the automatic transfer to the uplink of data bearing said verification information, and the automatic computation of billing to the advertisers and payments due to the local station affiliates. These and other objects, advantages, features and characteristics of the invention will be apparent from the following description of a preferred embodiment, considered along with the accompanying drawings.

DESCRIPTION OF THE DRAWINGS

FIG. 7 presents an overall chart of what happens in the DMC, with series of parallel X-planes representing tasks, Y-planes representing functions and Z-planes representing users.

DESCRIPTION OF A PREFERRED EMBODIMENT

Figure 1:
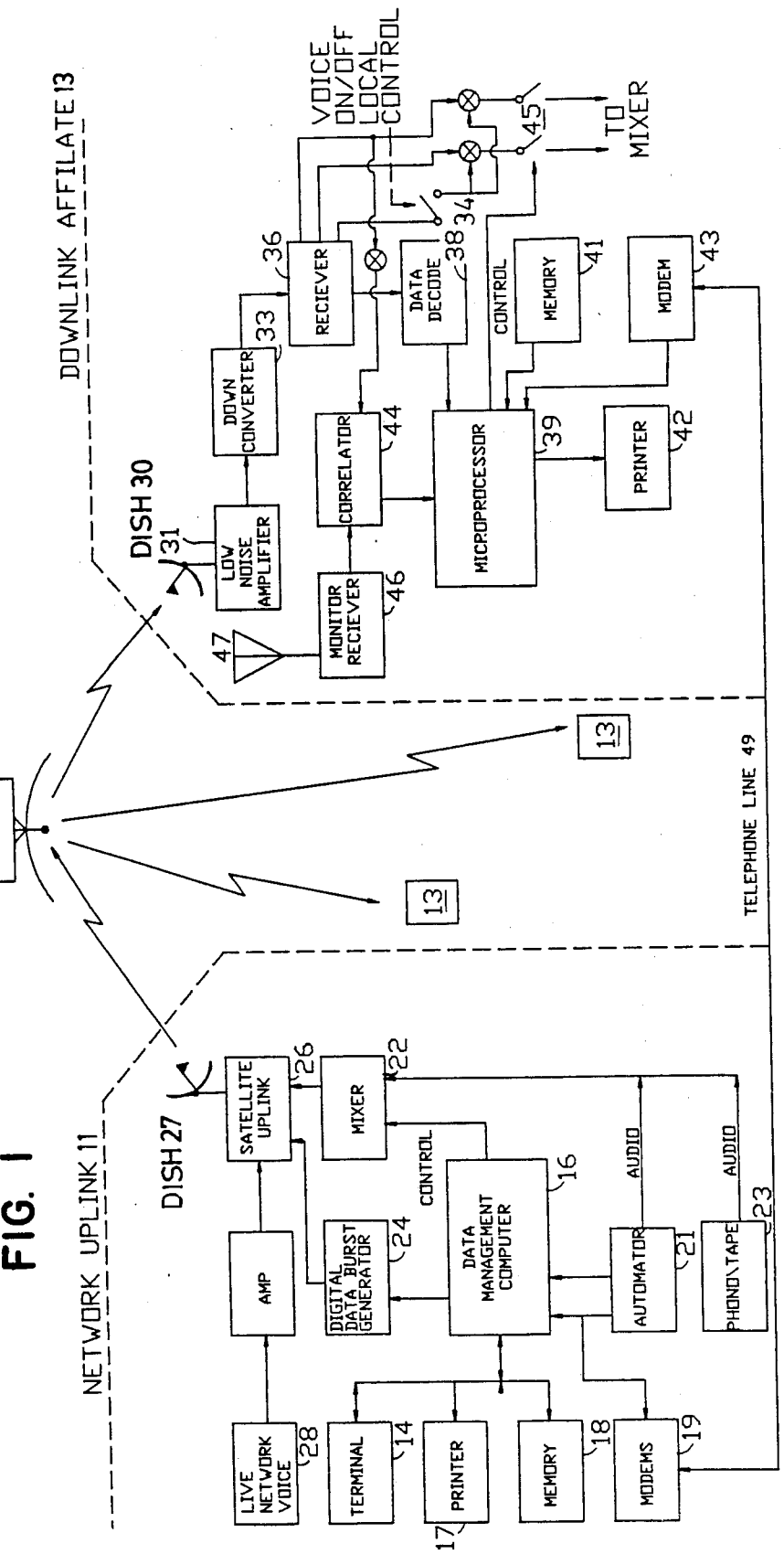
FIG. 1 is a schematic representation of the system of the invention, indicating a network uplink facility, an earth-orbiting geosynchronous satellite, and a plurality of local radio station downlink facilities, one being indicated in block diagram form.

The System (FIG. 1):

In the drawings, FIG. 1 shows in schematic form an automated satellite audio broadcasting system 10 according to the invention. Major components shown in FIG. 1 are an uplink facility 11 for network transmission of audio programs and broad based advertising, as well as encoded databurst information; an earth based satellite 12 in geosynchronous orbit, used by the system; and a plurality of downlink local radio station facilities 13, one of which is indicated in block diagram form in FIG. 1, for receiving the network audio programming and advertising as well as encoded information, all via the satellite.

The network, including the satellite 12, is capable of all forms of operation. It may use subcarriers if desired. Several communication firms currently have such satellites in orbit, and the satellite 12 may comprise the Western Union Westar III.

Uplink Network Facility:

At the uplink network facility 11, a computer terminal 14, which may be, for example a DEC JT100 or a WYSE WY50, with a keyboard and screen, allows a system operator to monitor system functions and to control a central data management computer 16 (sometimes referred to herein as DMC). The computer may be, for example, an ATT 3BU or a Heurikon Mini Box. Also shown connected to the data management computer 16, which is the central controller of the entire system, are a printer 17, which may be an Epson RX-80, a memory 18, preferably a disc memory, which may be a Heurikon Mini Box, and a modem 19, which may be a Racal-Vadic. The printer 17 is used to print system status and to print bills to advertisers and checks to local radio station subscribers for network advertising played by the subscribers, as outlined further below.

The memory 18 is used to store system parameters and to store data retrieved from each downlink facility, relating to determinations of periods of departure of the affiliate radio station broadcast from the network programming, relating to other data sent by modem from the affiliates or downlinks, and relating to information needed regarding each affiliate radio station and each advertiser, as further discussed below. The memory 18 also stores all software for the uplink, including all programs and their parameters, all directories, dictionaries and accounts.

The central data management computer 16 receives program data information from an automator 21. The automator 21 may be a Cetek 7000, which has its own computer and keyboard for the entry of programming information by an operator. This program data contains specific information relating to advertisers and the advertising to be transmitted, along with time/date information generated by the automator. The automator 21 feeds this information into the data management computer 16, as a pre-scheduling format, with a stack of events to be transmitted. Based on the program running at any given time the computer 16 uses the automator information to control a mixer 22 so that the programming audio will be from any of several sources such as automator audio or phone/tape audio as indicated in the box 23 in FIG. 1. The mixer may comprise, for example, an Autogram IC-10 modified to allow digital control.

FIG. 1 also shows a digital databurst generator 24 connected to the central computer 16 to receive commands therefrom. The computer 16 commands the digital databurst generator to format databursts based upon specific information to be transmitted, including information pre-scheduling programming for a future period of time, such as for the coming day or week; the databursts may include information transmitted simultaneously with a specific program segment or advertisement, for identification and logging purposes; and it may include timed cue triggers which provide a triggering signal which may be used by optional local "slave unit" radio station equipment at the affiliate, for automatically activating replacement local programming or advertising audio played on the local station equipment. Two other important functions the databursts may handle are resynchronizing affiliate real time clocks periodically to an uplink master control clock; and individual coded access to each downlink station separately, for functions relating to that station individually (such as shutdown of a station, advice of solar outage coming for that station, or bringing the station online initially). The digital databurst generator may comprise, for example, a Metacomp COMM-2000 Server.

The digital databurst generator generates short bursts of data or "packets" of information consisting of header, information frame, frame check sum and stop flags. As is known by those skilled in the art, the header contains information and it can simply comprise a flag. It can lock up a phase lock loop. The header will contain, for example, a byte of data advising what piece of information will be coming in the databurst. The frame check sum ensures the data has been received correctly. It checks the integrity of the total databurst. The receiving equipment can be set up to indicate, either at the affiliate downlink or the network uplink, errors exceeding a pre-selected number per event or per period of time. Indications of such excessive errors can be brought to the attention of the uplink by modem equipment including the modem 19 at the uplink. In any event, each databurst generally is sent more than once, preferably two or three times, so that an occasional error is of no effect.

The data from the digital databurst generator 24 is modulated and multiplexed along with audio from the mixer 22 to a satellite uplink transmitter 26, transmitting to the satellite 12. The uplink transmitter 26 transmits both data and audio, and comprises a microwave transmitter and an antenna indicated at 27 capable of transmitting to the satellite 12.

The Satellite Uplink:

The uplink 26 preferably has audio and the digital databurst information transmitted on two carriers, which may each have a bandwidth of 25 KHz. The databurst information may be carried on one carrier with right audio, and databurst may be at the top end. The other carrier carries left audio and the network voice.

Figure 2:
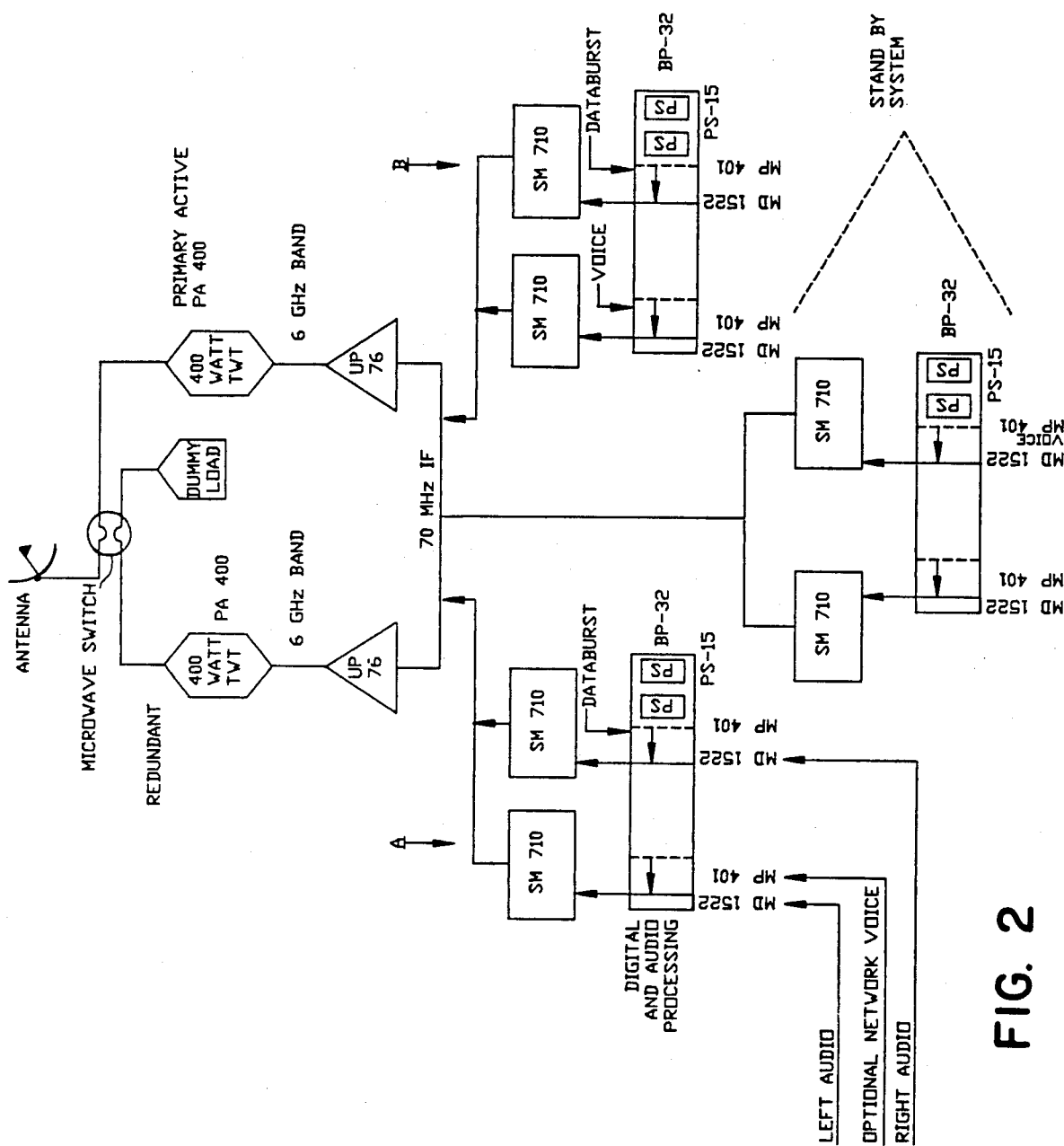
FIG. 2 is a schematic diagram of a satellite uplink included in the network uplink facility shown in FIG. 1.

FIG. 2 shows in block diagram form a preferred configuration of the satellite uplink 26, shown as one form of Modulation Associates SU-10 as referred above. The uplink as represented in FIG. 2 is redundant and consits of equipment (A and B) for two networks each having one left channel of audio, one right channel of audio and each one data channel and network voice channel. The optional network voice preferably is not handled by the mixer 22, but is an independent input to the uplink 26 as indicated in FIG. 1. There, a box 28 shows the network voice going directly into the uplink 16, through an amplifier.

FIG. 2 additionally shows that a spare standby network input C may be included. Also, only one of the 400 watt TWT (traveling wave tube) transmitters shown in FIG. 2 is required for these two networks. A redundant TWT is included, as discussed further below.

As indicated in FIG. 1, network audio from the automator 21 is connected as an input to the mixer 22, which also receives input from auxiliary program sources such as a tape player and phonograph. The DMC controls which will be the audio source that will be transmitted. Mixer output is connected to a Modulation Associates BP-32 (FIG. 2), which is a card cage consisting of two PS-15 power supply modules to power the rack, two MD-1522 (multiplexer) modules (left and right audio inputs from the mixer) and two MP-401s for data input from the data burst generator and for network voice. The MP-401s are multiplexer cards.

The output from the MD-1522/MP-401 combination is a frequency multiplexed composite signal (still at audio frequencies). The SM-710 frequency agile modulators in FIG. 2 each take one of these composite signals and modulate it on a carrier having a center frequency from 50–80 MHz. This signal is upconverted (by multiplying by 76) as indicated up to the 6 GHz band where is is amplified by the TWT up to the 400 watt level ready for connection to the antenna 27. The modulated carrier frequency (50–80 MHz) is chosen so the resulting upconverted frequency is the assigned transmit frequency (FCC assignment).

The other TWT (on left in FIG. 2) is in "hot standby", running into a dummy load. If a failure occurs with the primary TWT, the microwave switch automatically connects the standby TWT to the transmitter while connecting the primary TWT to the dummy load.

The satellite uplink system 26 as shown and described constitutes one example of uplink equipment which may be used in the system of the invention, being a form of Modulation Associates SU-10 as referenced above. Other suitable uplink systems may be used as desired.

The Local Affiliate Downlinks:

Each affiliate downlink facility 13 contains equipment placed by and controlled by the uplink network organization. This equipment, principally as diagrammed in FIG. 1, interfaces with equipment owned by the local radio station, such as a mixer board (not shown in FIG. 1) and other equipment which may take advantage of some features of the system described below.

The affiliate facility includes a dish antenna 30 aimed at the geosynchronous satellite 12. Mounted on the dish 30 is a low noise amplifier (LNA) 31, indicated in the box in FIG. 1. The LNA amplifies the signals received, introducing very little system noise. A downconverter 33 converts the microwave signals to 70 MHz. The dish 30, LNA 31 and downconverter 33 may all be products manufactured by Modulation Associates. A receiver 36 of the subscriber radio station facility receives the downconverted signal.

The receiver 36 may comprise, for example, a Modulation Associates MC-SAT. The downlink receiver 36 includes frequency division demultiplexers, which differentiate the digital databurst information, network voice and the network audio (e.g., stereo music or advertising). The network audio is sent out (via lines 37, for right and left, indicated in Fig. 1) to the audio mixing board (not shown) of the subscriber local radio station. As indicated in FIG. 1, control of whether the optional network voice is mixed into the affiliate station's broadcast is given to local station personnel. A manual switch 34 preferably is included (as the only front panel switch on the network-placed downlink equipment) to allow the local station operator to manually select whether the network voice is to be included or not.

The digital databursts received over satellite are decoded by a data decoder 38, which may comprise a GLB PK1, by stripping off the header and using the frame check sum to detect errors, as outlined above. Several bursts are sent to assure that at least one will not have errors. The output of the decoder 38 is connected to an input of a downlink microprocessor 39.

The downlink microprocessor 39 may comprise a Transwave K-9000, and it is also connected to a memory unit 41, a printer 42, a modem 43 and a correlator 44. The memory unit may be a Transwave M-9048, while the printer may comprise an Epson RX-80. As in the uplink, the modem may be a Racal Vadic, and the correlator 44 preferably comprises an analog comparator, as described below with reference to FIG. 3.

The decoded databurst information fed to the microprocessor 39 is stored in the memory 41 at the affiliate facility 13. The microprocessor controls the printer 42 to print advertiser information from the databursts and to print status reports, as well as other desired information for the downlink operator. One important feature in using the databurst information is, as mentioned above, the transmitting of pre-scheduling by databurst, so that, for example, at the beginning of a day (e.g., at midnight) a pre-schedule for the coming day can be transmitted. This can be automatically printed by the printer 42 via the microprocessor 39. Also, databursts may optionally be included which occur simultaneously with specific program segments and advertising spots, to be received and processed to create through the printer a log of programming and advertising as it actually occurs, with advertisers identified.

An automatically-controlled double-throw switch 45 is shown in the audio lines 37 leading to the affiliate's mixer in FIG. 1. As indicated by the control line, this switch is controlled by the microprocessor 39, in response to specific access databurst instructions received over satellite. For example, the microprocessor 39 may be instructed by the network to shut off network audio to the local station if a subscription payment has not been made, or for other reasons.

As also indicated in FIG. 1, and as mentioned above, cue triggers may be issued from the microprocessor 39, conducted to local equipment, from databursts received over satellite. These can help the local station automate the timing of local announcements originating at the local station.

The Correlator and its Function:

A monitor receiver 46 with a small antenna 47 monitors the actual broadcasts of the subscriber local radio station. This local broadcast signal and the network audio (entering via a line 48 in FIG. 1) are correlated by the correlator 44 to detect noncompliance. The correlator 44 detects periods of departure of the local broadcast from the network audio, and notes them by indicating the time the station goes off the network audio, and the time it goes back on the network audio. This is done in conjunction with the microprocessor 39, and the periods of departure information is fed into the memory 41 for storage until the information is transmitted to the uplink.

The terms "correlate", "correlator", "correlation record", etc. as used herein and in the claims refer to the functions and product of the correlator 44, as detecting whether local affiliate stations are broadcasting network material or not. As such, the terms are not to be confused with the correlation of data in general.

Figure 3:
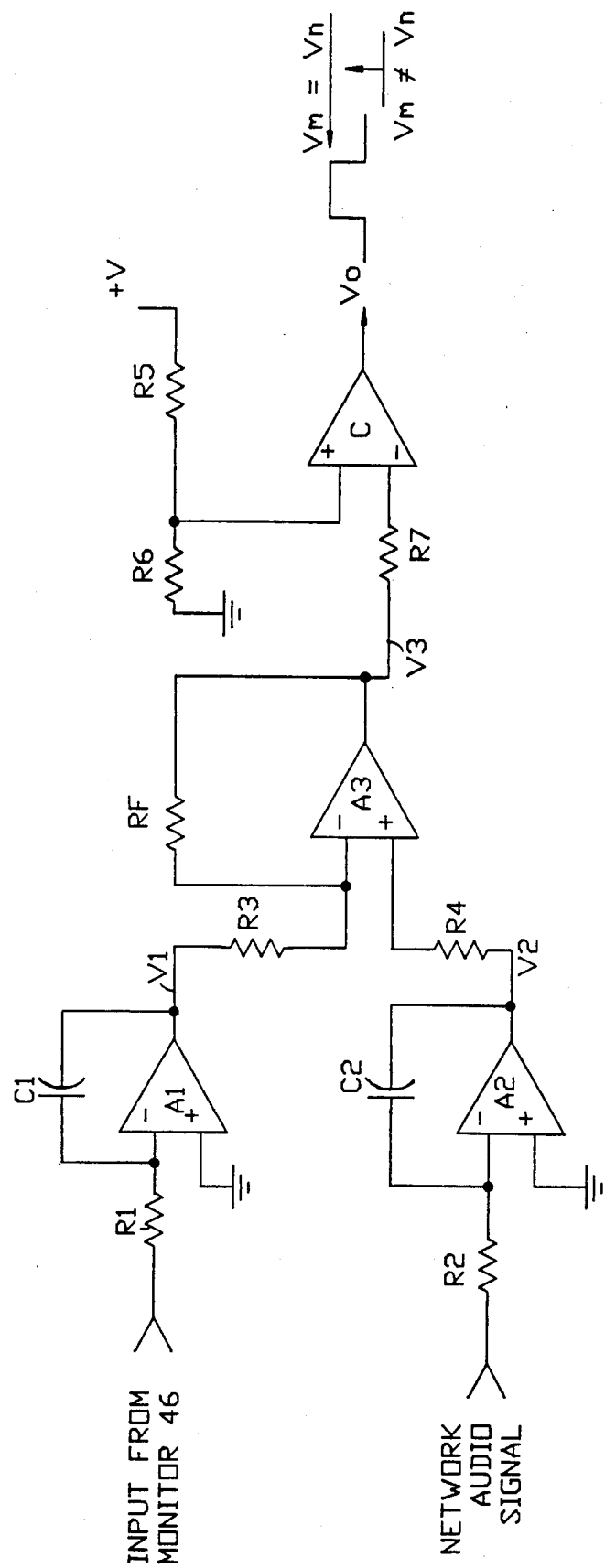
FIG. 3 is a schematic circuit diagram of a correlator included at each downlink, for determining and providing a signal indicating times when the local station goes "ON LINE" and times when it goes "OFF LINE" with respect to the network broadcast from the uplink.

The correlator 44 is diagrammed in FIG. 3. It uses an integrating principle and involves a differential amplifier driving a zero-crossing detector, for recognizing points of departure of the local broadcast from the network audio, and points where they again coincide.

The function of the correlator is simply to determine, in real time, in every moment of operation of the system, whether or not what is being broadcast by the downlink radio station coincides with what is being sent by the network over the satellite.

As indicated in FIG. 3, the correlator 21 receives inputs from the monitor receiver 46, which is the audio played by the local downlink station, and also from the downlink receiver 36, which is network audio received at the affiliate over satellite. The monitor signal 46 goes into a first integrator comprising $A_1$, $R_1$ and $C_1$ and the network audio goes into a second integrator comprising $A_2$, $R_2$ and $C_2$ in FIG. 3. This integration averages the signal over a time period. The outputs of both integrators are voltages $V_1$ and $V_2$. $R_1$ and $C_1$ and $R_2$ and $C_2$ determine the time integral of integration for correlation at each location. Integration avoids the interpretation of a non-correlation event occurring on a noise spike.

Networks ($R_1$ and $C_1$) and ($R_2$ and $C_2$) both set the time interval for integration. Each side integrates over the same time period so that correlation can be accomplished.

The two voltages $V_1$ and $V_2$ may either be added or subtracted. In the preferred embodiment shown in FIG. 3 they are subtracted at $A_3$ and $R_f$, a feedback resistor which sets gain. The input level and the network audio level are known and should be the same. If there is correlation between the local station and the network, the outputs $V_1$ and $V_2$ will be similar and subtracted to achieve a zero value $V_3$. If there is non-correlation, then $V_1$ and $V_2$ will be only partially subtractive so that a non zero value of $V_3$ will result from the subtraction of $V_1$ and $V_2$.

The $V_3$ signal downstream of $A_3$, as shown in the schematic drawing, is fed to a comparator C. As indicated, $R_5$ and $R_6$ set a reference voltage input $V_{ref}$ to the plus side of C, while $V_3$ is input to the minus side of C. When $V_3$ is less than the reference voltage, then there is correlation, and the comparator puts out a digital output signal $V_o$ indicating "ON LINE". The signal may have a value of $V_o=1$. When $V_3$ is greater than $V_{ref}$ then the $V_o$ signal indicates "OFF LINE", which may be represented by $V_o=0$. This digital output is indicated in the graphic representation at the right in FIG. 3.

A signal is thus constantly sent by the correlator 21 indicating "ON LINE" or "OFF LINE", and this is received by the downlink microprocessor 39 as indicated in FIG. 1, which notes a time when each change between "ON LINE" and "OFF LINE" (or vice versa) occurs, and this information is stored as raw correlation data in the downlink memory 41.

Transfer of Correlation Information and Other Occurrences to Network Uplink:

The system 10 of the invention includes the transfer of stored information relating to periods of departure, i.e., to correlation or non-correlation as described above, from the downlink to the uplink from time to time, via the modems 43 and 19 and long-distance telephone lines 49. Other data is also transferred over the modems. The downloading may be accomplished in several ways. The downlink microprocessor may call the uplink computer during specific time intervals, repeating until a connection is obtained, whereupon the content of the memory 41 will be unloaded relating to the periods of departure or correlation and transferred to the uplink's memory 18. Other data may be sent in this way, such as detected system malfunction, specific uplink commands, or other specific event occurrences such as time sync complete. Another manner of accomplishing this transfer is for the downlink microprocessor to call the uplink computer only when then downlink memory 41 is approaching being full to capacity, whereupon its memory relating to the periods of departure and specific event occurrrences will be transferred. A third method, and the preferred method according to the invention, is for the uplink computer 16 to signal downlinks by individual access codes over the satellite, instructing each at different times to call the uplink by modem and to transfer all pertinent informatin to the uplink for period billing and payment purposes.

In any event, when the downlink modem 43 calls the uplink for this purpose, it issues an interrupt for the downlink microprocessor 39 to communicate with the data management computer 16 of the uplink, so that all pertinent information can be sent to the uplink computer 16.

For economy of time, memory, and use of long-distance telephone lines, standard data transmission technology such as datastreaming is used.

Operating Routine of the System:

The paragraphs below describe what occurs in the normal operating routine of the satellite audio broadcasting system 10 of the invention. It will be appreciated by those skilled in the art that the following description will enable programming to be written in a desired programming language. Such programming to achieve the described functions is well within the ordinary skill of those familiar with the art.

With reference primarily to FIG. 1, the downlink microprocessor 39 is programmed so that it records in the memory 41 each time at which the correlator 44 indicates that a change has occurred in correlation or non-correlation (as well as all other occurrences represented by the list of status codes below). At each change in the status of correlation/non-correlation, i.e., as each record is made, a status code is used, such as listed below: ON, meaning the local station has gone on line at that point, or OF, meaning the local station has gone off line at that point. The time is recorded with the status code. In this way a chain of occurrences are recorded at the downlink and stored in memory, including many types of occurrences (e.g., see status codes below) in addition to ON and OF.

All of these occurrences, having been collected as raw records in the memory 41 at the downlink, will be transferred to the DMC.

At a preselected time interval, such as once per day or once per week, the downlink microprocessor 39 transfers the sorted file of information from the memory 41 over the downlink modem 43 and telephone lines 49 to the data management computer 16 at the uplink, via the uplink modem 19. This may be triggered by digital databurst sent by the uplink over the satellite to the downlink 13, by an individual accessing code in the databurst, instructing the downlink microprocessor to telephone the uplink and to unload the contents of its records stored in memory. Another means is to autodial at the downlink, initiated by failure detection at the downlink.

When this instruction is sent (which may be in the early hours of the day when long distance telephone rates are at a minimum), the downlink microprocessor 39 continues to monitor and store status records and at the same time streams data out of memory and over the modems to the uplink. This transfer may be accomplished weekly, for example, for each affiliate station. Such automatic transfer of data via computers and modems is conventional and well known to those skilled in the art.

When the data transfer process has been successfully completed and all data received by the data management computer (DMC) 16 at the uplink, a signal is sent to the downlink microprocessor to confirm the successful transfer. This can be done either by a signal sent by the DMC 16 over the telephone line, or the DMC 16 can cause a signal to be sent over satellite to the downlink confirming that the data was received. Such a satellite signal is coded for individual access to the particular downlink station only.

When the downlink station equipment has received the confirming signal, it then deletes the previous memory contents, or, according to preset instructions, it can first print out for the benefit of the local operator a copy of what has been sent to the uplink, which will be a series of indications of transitions to "on the air" or "off the air", and all other specific occurrences as exemplified by the list of status codes below, with the time of occurrence of each.

The downlink microprocessor system continues to record events and all high level data management is done in the DMC.

The data management computer 16 at the uplink by this process collects data from all of the subscriber downlink stations, which may be several hundred. It therefore accumulates a very large number of data records in the uplink memory 18. The data management computer 16 must process these records, resulting in the creation of files.

Using these correlation records and other stored information files relating to advertisers, downlinks, rate information, and to what has actually been played over the network, the DMC 16 makes comparisons and creates new files for several different purposes. One file to be generated is a file for each downlink station for the subject period of time which essentially comprises a file of transaction records compiling all advertisements actually played by the local station, which at that point may include a dollar amount payable to the station for the playing of each ad.

Figure 4:
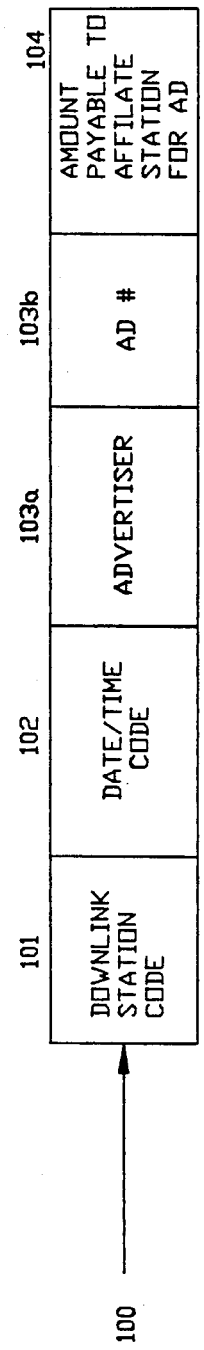
FIG. 4 is a schematic diagram representing a form of transaction record which may be comiled from data from each correlator at the downlink affiliate stations and from other stored data at the uplink.

Each transaction record may be represented in the diagram of FIG. 4 as a transaction record 100, including a code identification 101 of the downlink station, a date/time code 102 (which can identify the time the ad began playing), a code identification 103 which can include identification of the advertiser 103a and an ad number 103b for that particular advertiser (a single code can identify both), and an indication 104 of the dollar amount payable to the local station for playing the particular ad at that particular date and time, computed by the data management computer 16.

In order to compile such a file of transaction records 100 as diagrammed in FIG. 4, the uplink memory 18 has several background files of information prestored as references to create the file of transaction records 100 (see Fig. 5): (1) a file (File No. 1) relating to each affiliate downlink local station, with all pertinent information on each affiliate, including indication of where the station is located, whether there is any broadcast power change between day and night hours and whether the station is regularly off the air for any portion of a day, and the advertising billing rate or fee table for the station, including multi-level rates for different times of day if applicable; (2) a file (File No. 2) relating to each advertiser which advertises over the network, including indication of the identity of the advertiser, what advertisements are currently being broadcast for this advertiser, identified by number or code, length, and any special billing information which might be associated with this advertiser, such as applicable volume discount; and (3) a file (File No. 3) of time-based records indicating what advertisements of which advertisers were broadcast by the network at what times. This latter file, which may be called a Master Log File, is originated by the uplink automator 21 as described above, and includes program data with specific encoded information related to advertisers and advertising, along with time/date information. The file is generated in real time as the advertisements are played, by encoded data on tape, or it may be based on the pre-scheduling format discussed above.

Figure 5:
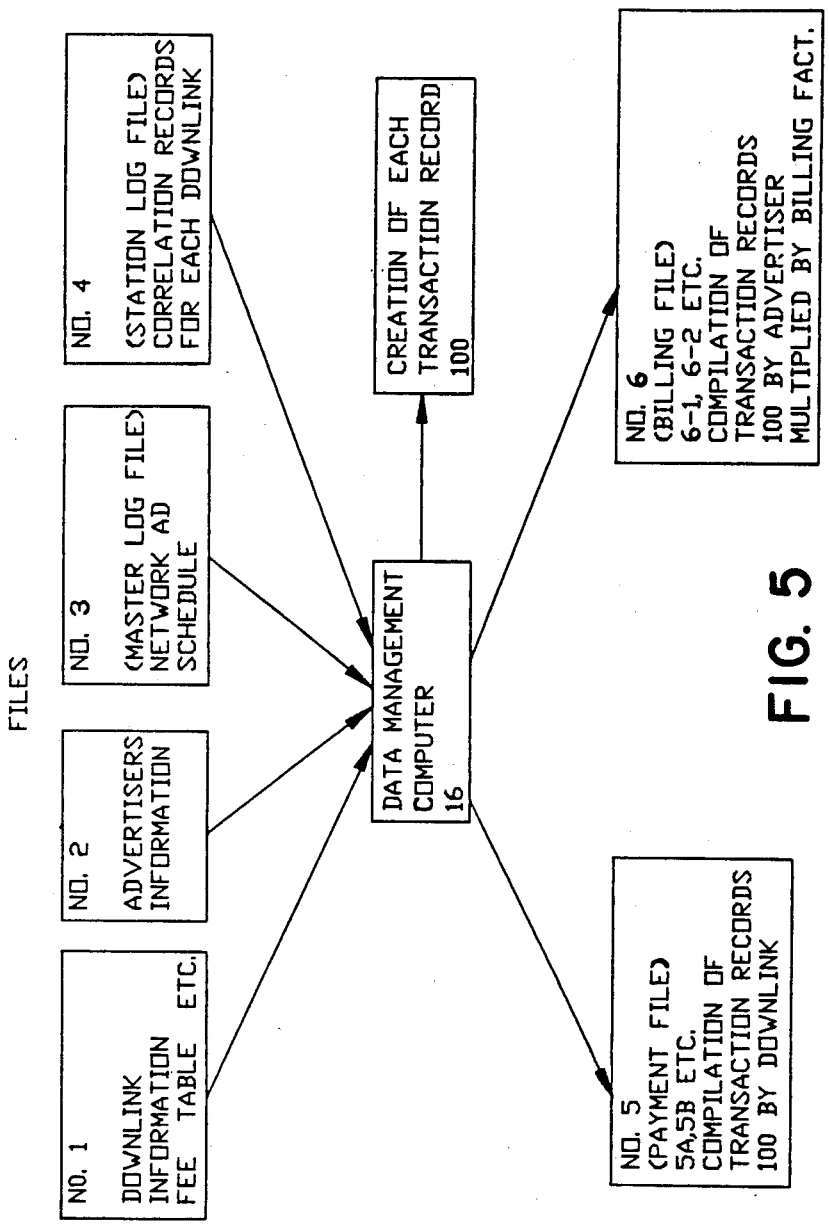
FIG. 5 is a schematic diagram indicating the compilation of files for computing payments due to affiliate stations and for computing billings at advertisers for advertisements played by each station. The central data management computer compiles these files using correlation records from each affiliate station and using other stored data relating to the downlinks, the advertisers and the network ad schedule.

Against these background files the data management computer 16 uses the Station Log File (File No. 4) of correlation/non-correlation for the particular downlink station and creates series of transaction records 100 similar to what is shown in FIG. 4, for each downlink affiliate (see FIG. 5). It compiles the transaction records by downlink, into a billing file, File No. 5 as indicated in FIG. 5, by comparing the correlation/non-correlation records for the station (from Station Log File No. 4) with the automator-generated Master Log File (File No. 3) listing the ads and dates/times when they were played, to determine what periods of correlation (or of non-correlation) included advertisements and to thereby compile a list indicating the ads that were actually played by the local station (or the ads that were not played). In generating each tranaction record, the computer 16 looks up the applicable billing rate (in File No. 1) for each playing of an ad by the particular downlink station in accordance with the time of day when the ad was played, if applicable, and in accordance with any special billing information in the advertiser's file (File No. 2) relating to this particular ad (e.g., length of the ad). The amount payable 104 to the affiliate for playing the ad, as shown in FIG. 4, is computed.

It should be understood that the dollar amount due need not be computed at this time, as part of the file of records 100, but could instead be computed later after compilation and sorting of a large number of records 100.

Another file, File No. 6 in FIG. 5, which must be created by the data management computer 16, is an advertiser billing file to compute the total amount owed by an advertiser for the playing of its advertisements on all network downlinks which played the ads in the billing period involved. Such a billing file can be created from File No. 5 including the records 100 (see FIGS. 4 and 5), simply by sorting the records 100 by advertiser (103 or 103a). The amount to be billed to an advertiser will be more than the amount payable 104 to the station shown in the record 100 for a given ad transaction. The system may simply multiply the downlink amount payable 104 by an appropriate factor to arrive at the amount billable to the advertiser, which will then include overhead and profit to the network. The factor may vary depending on the number of ads the advertiser has purchased, i.e., to reflect a volume discount, and this information is contained in File No. 2 relating to advertiser accounts.

It should be understood that in creating Files Nos. 5 and 6 for determining the total amount payable to each downlink station and the total amount billable to each advertiser, the data management computer 16 may either keep positive records of instances of ads actually being played by a station, as represented in the record 100 of FIG. 4, or it may create a record in the negative, listing all ads which were *not* played by each station. In either event, the amount payable to a particular station can be calculated from such records, and the amount billable to a particular advertiser can be calculated, by subtracting from total possible billing all instances wherein an ad was not played at each station. The manner in which these records are kept and the computations made is dictated by choice and by the probable number of ads an average station will play and not play. For example, if the average station will only cut out a small percentage of network ads from its local broadcasting, it may be more efficient for the computer 16 to create records in the negative.

If any dispute arises between a local station and the network as to the amount payable to the station from advertising, these records are available from the uplink DMC 16 for verification and printing. Similarly, an itemized billing log and invoice may be printed out to show each advertiser the basis of its bill.

Once the station payment files (No. 5) for the downlink affiliate stations and the advertiser billing files (No. 6) for each of the advertisers have been processed by the DMC 16, checks will be printed in payment to the downlink stations, and invoices will be printed for each of the advertisers, for the subject period of time.

A Working Example — Automated Billing and Payment:

As an example, the following describes the creation and handling of the transaction records 100, i.e., processing or a database file, as diagramed in FIGS. 4 and 5.

The time period selected for billing and payment may be a calendar month, and this discussion will assume the subject period is the month of January. Correlation/-non-correlation records have been made and compiled by the correlator and microprocessor at each affiliate station, and stored in downlink memory 41. This Station Log File is File No. 4 as described above, and for Station A in the network, it may be designated Subfile 4-A. As described above, the uplink data management computer 16 periodically receives all the data in this file and compares it with File No. 3 compiled at the uplink, comprising an automator-originated record of what ads were played over the network at what times, and this is accomplished by a simple look-up function of the computer. The result is a listing of what particular advertisements Station A did play or did not play, since File No. 3 has a listing relating data and time to the network broadcasting of ads. The form of this listing may be a series of transaction records 100, with the data management computer referring to Files Nos. 1 and 2 as well as Nos. 3 and 4 to create the records 100 including amount payable. Alternatively, a simple listing of which ads Station A did play or did not play may be the subject of an intermediate file (not shown), before the complete transaction records 100 are created.

Since File 5 contains the transaction records 100 generated by respective station (e.g., using correlation File 4-A relating to Station A), Payment File 5 will contain payment subfiles grouping transaction records for each station. Thus, a subfile might be designated 5-A for Station A's transactions records for the month.

Billing File No. 6 is a compilation of transaction records 100 organized by advertiser, and may therefore include Billing Subfiles 6-1, 6-2, 6-3, etc. to relate the subfiles to Advertiser No. 1, Advertiser No. 2, etc.

To compute an invoice and statement for Advertiser No. 3, for example, which may be Ajax Corp., the computer 16 takes all transactions records 100 that relate to Advertiser No. 3. These records are from, for example, Stations A, B, D, F, J, K, ... AA, AB, etc. — all local stations that played any of Ajax's ads.

Next, the computer multiplies the amount payable 104 in each transaction record by the appropriate billing factor, looked up from File No. 2 and reflecting a volume discount or any other information affecting billing, if applicable. There may be a standard factor, such as 1.4 or 1.5, modified only if File No. 2 contains modifying information applicable to the advertiser.

In preparing an invoice and statement for Ajax Corp., the computer 16 can compile a listing from Billing Subfile No. 6-3 of how many instances each of Ajax Corp's ads was played — Ajax Corp. may have three or four or five different ads being played over the network. For example the compilation may be made by ad number, breaking out how many times Ajax Corp. Ad No. 1 was run over the local stations, and it can easily be broken down to different markets including groups of local stations, or by each local station individually, depending on the detail required by the advertiser. For example, the statement to the advertiser can detail that Ajax Corp. Ad No. 1 was played 300 times in Market A during the month of January, 450 times in Market B during January and 175 times in Market C during January; that Ajax Corp.'s Ad No. 2 was played 85 times in Market A during January, etc. Markets A, B and C are defined for the advertiser as including specific groups of affiliate stations grouped by region or by demographic considerations, all kept as background data in the memory 18 for use by the computer 16 in its processing functions. For example, this information may be contained in File No. 1.

With all these correlation, compilation, billing and payment functions performed automatically, an attendant at the network uplink 11 has only a few tasks, for example entering programming scheduling into the automator 21 as needed (this all could be pre-taped by a separate service), changing tapes on the automator as necessary, receiving checks from the advertisers in payment of bills and depositing them in an account, and performing any trouble shooting functions in response to trouble calls indicated on the terminal 14, originated at the uplink or any of the downlinks.

Handling of Functions by DMC (FIGS. 7 and 8):

The DMC 16 is a multi-user, multi-tasking system, necessary for the processing of all data by concurrent users. Several users may control various tasks simultaneously. Tasks using predefined functions process data in cells 110 (FIG. 8) of the memory 18. One task is assigned to control the execution of every other task, as is known in some programming contexts to those skilled in the art.

Figure 7:
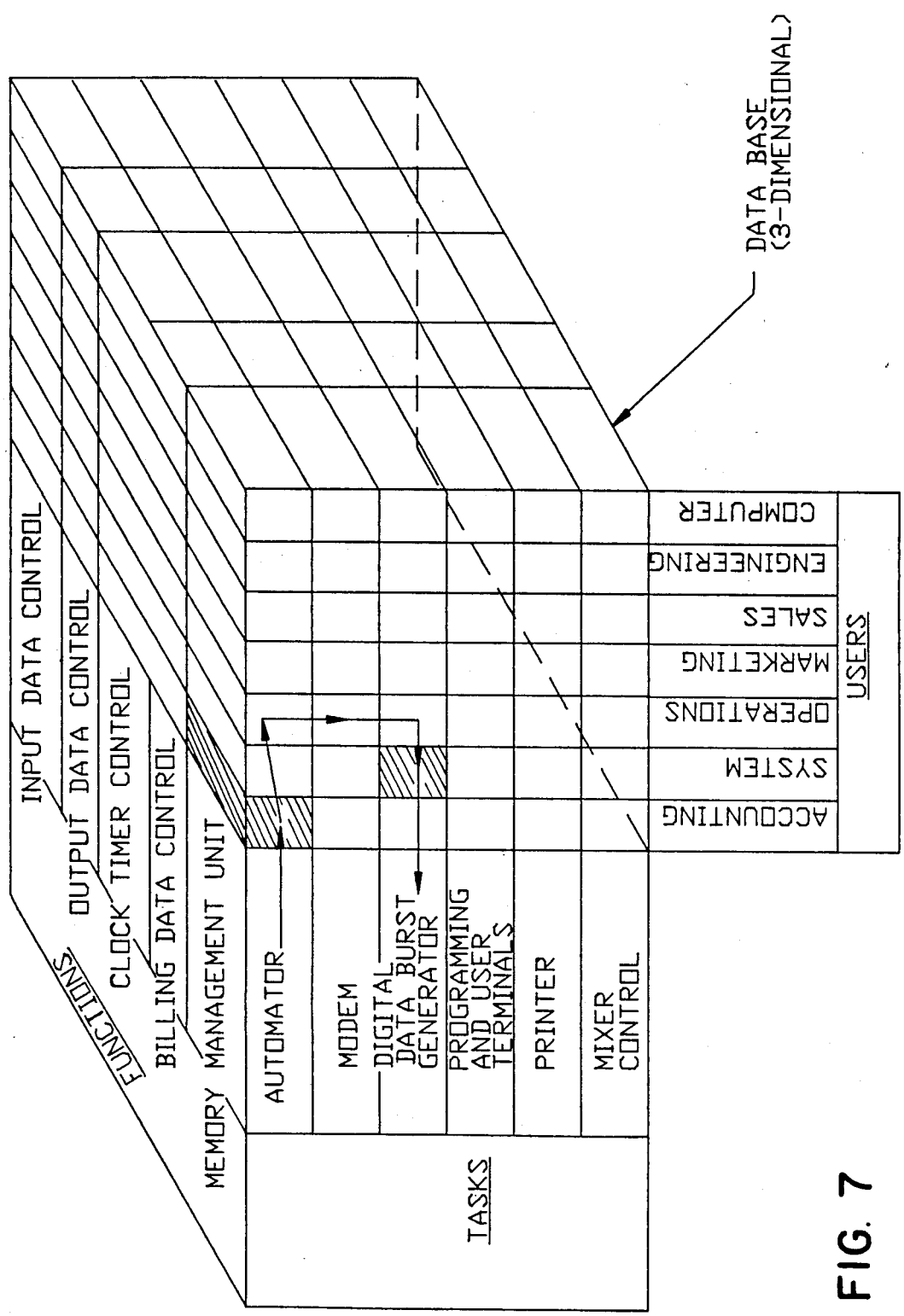
FIG. 7 is a graphic representation, in isometric three dimensional forms, showing a database for a data management computer (DMC) of the system, at the uplink.
Figure 8:
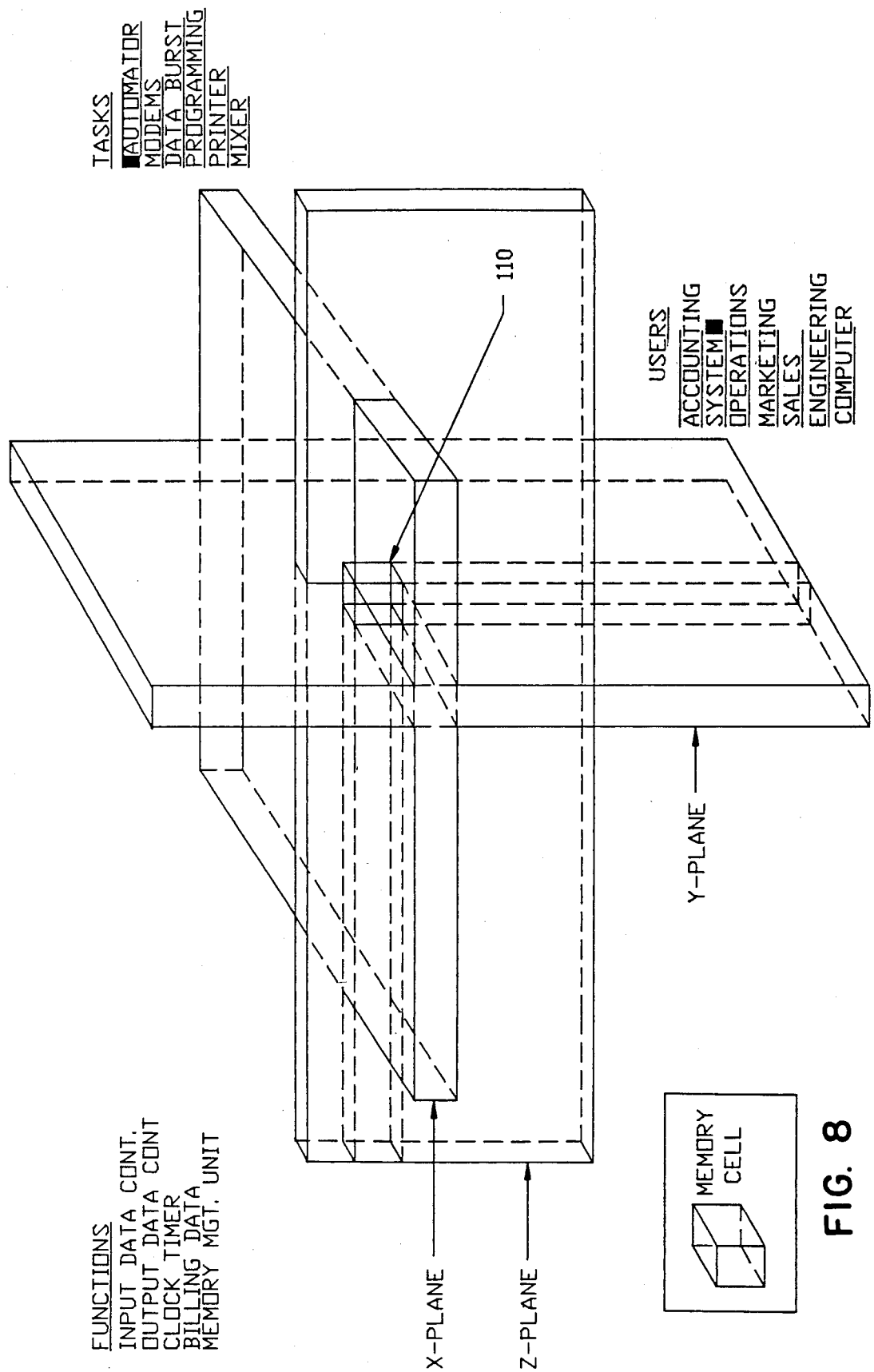
FIG. 8 is a companion chart to FIG. 7, showing the intersection of three planes of the X, Y and Z-planes to define an active memory cell at the intersection.

An example, illustrated schematically in FIGS. 7 and 8, is that process required to notify the system that the automator is ready to send data to the databurst generator. FIG. 7 represents the database in three-dimensional matrix, as an entity of its own. It is continually being updated. As an example, the automator outputs a signal 111 (FIG. 7) via the task's assigned functions, which a predefined function module (in this example, the Memory Management Unit) will process and pass to its user for action. FIG. 8 shows the accessed memory cell 110 at the intersection of X, Y and Z planes, the active task, function and user planes in this example.

Due to many users and tasks performing these various functions, it becomes necessary to be able to change the structure of the database memory 18 as the system environment changes. Accurate billing is achieved as the data in the database memory is always current. The accounting user, for example, uses the incoming background files of information, i.e., Files Nos. 1, 2, 3 and 4 in FIG. 5, in processing data to create Files Nos. 5 and 6.

Security is built into the system. For example, Sales users are blocked from accessing the Memory Management Unit.

Outline of Programming:

The discussion which follows prvides an outline of computer programming and operational features presently preferred for use at the downlink affiliate stations 13. It should be understood that any suitable programming may be employed to achieve the functions as already described, and that the writing of such programming is well within the ordinary skill of the artisan.

Figure 9:
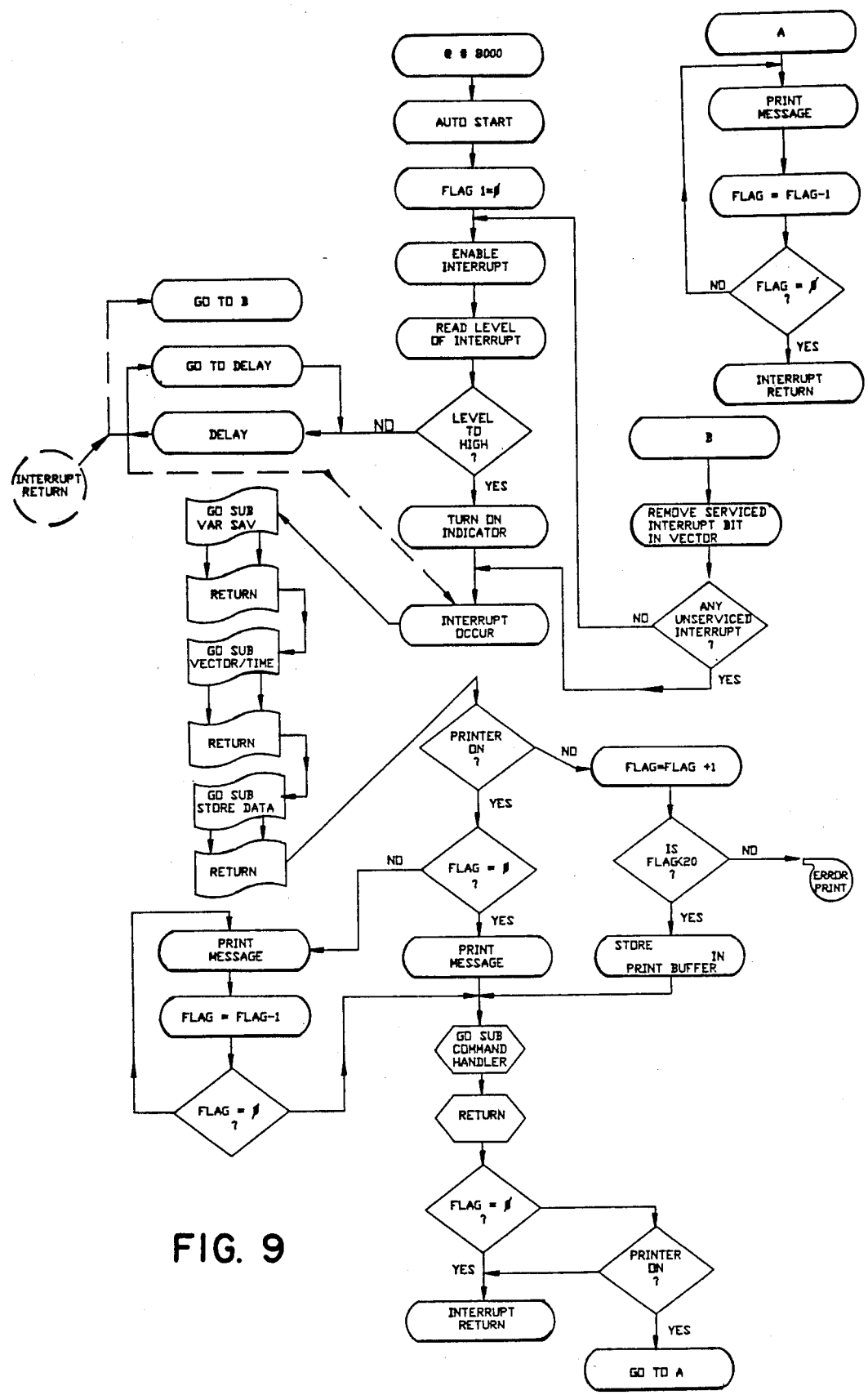
FIG. 9 is a flow chart illustrating programming which may be used at each downlink affiliate station.

FIG. 9 outlines in flow diagram format the core program for the downlink affilite microprocessor 39.

The preferred program is written in "Tiny Basic", resident on the national Semiconductor 8073 microprocessor. Beginning at Location #8000, the program begins execution. This is an automatic power on reset start location.

The program will begin to flow from the top left of FIG. 9. After initialization, the processor will be in an endless loop waiting for an interrupt to occur. This interrupt is generated by hardware for a specific type of event which also generates a hardware vector which when read by the processor indicates which event has triggered the interrupt. The flow chart of FIG. 9 is essentially self-explanatory to those skilled in the art, but some of the blocks in the diagram will be explained.

When an interrupt occurs, the first thing to happen is a jump to a subroutine called VARSAV which is a variable saving routine. This is to save previous data when a new interrupt is being serviced. Next the program jumps to a subroutine called VECTOR/TIME, which reads the exact time the interrupt occurs and the name of the interrupt which has occured. These are identified as discussed below. Next the data is stored in RAM sequentially for later retrieval by the data management computer 16 at the uplink.

The next few block in the diagram relate to printing of data and noting whether the printer is on or off, how many messages were missed if any, and having them all printed. The next step is to actually service the interrupt, that is, to perform whatever task is required. Once this is completed, the program goes back to waiting for another interrupt, and the serviced vector is masked out.

To help minimize the cost of downlink equipment, the system of the invention tends to make maximum use of the downlink printer 42. When an interrupt occurs, the printer will print a message such as the one below:

Saturday, June 15 16:03:37.4 STATUS CODE SA
Saturday, June 15 16:03:50.9 STATUS CODE TS where the status code identifies the interrupt event which has occurred. The real time clock provides the time data and the vector read provides the status code.

After printing of the event occurrence, the event is sequentially stored in RAM for later access by the uplink for analysis.

Figure 6:
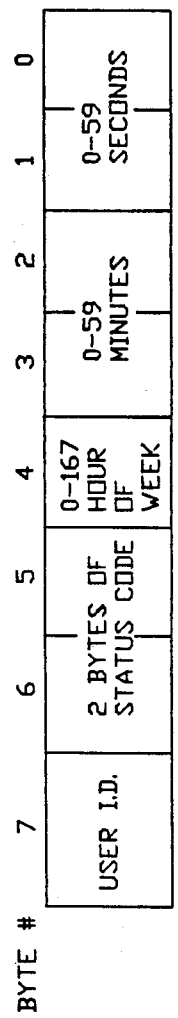
FIG. 6 is a schematic diagram illustrating one form of event recording format which may be used in the system of the invention.

Storage of the event consists of eight bytes of data in the form as diagrammed in FIG. 6. Time of the week starts at 0000 hours coordinated universal (Greenwich Mean) time on Saturday. The following is an example of a list of status codes which may be used in the system, with their respective meanings:

SA: Specific Access by network
ON: Local Station On Line (From correlator 44)
OF: Local Station Off Line (From correlator 44)
TS: Time Sync complete
DE: Satellite Data Error detected
TM: Telephone Modem not ready
LS: Printer Log Start
VO: Network Voice On
VF: Network Voice Off
LF: Printer Log Finished
MF: Memory Full
DS: Data Dump Start
DF: Data Dump Finished
PE: Printer Error
PO: Printer Operational
NE: Network Error
NO: Network Operational at Downlink
NF: Network Not Operational at Downlink Several of the block in the flow chart of FIG. 9 are used for the important task of making sure the printer is working. Both programming and hardware is involved in accomplishing this function. Circuitry (not shown) may be included for detecting several conditions, such as (1) paper out, (2) on line/off line, (3) connected of disconnected. Any of these conditions can be problematical, and the downlink equipment preferably includes an audible alarm to signal the condition to downlink affiliate station personnel. The downlink computer 39 will store records of such occurrences and will print them out when the printer goes back on line.

The preferred embodiment illustrated in the drawings and described above is meant to be exemplary of the principles of the invention, and not limiting of its scope. Other embodiments and variations to this preferred embodiment will be apparent to those skilled in the pertinent art and may be made without departing from the spirit and scope of the invention as defined in the following claims:

We claim:

1. A radio network programming and advertising system, comprising, a network uplink facility at a first location for transmitting network programs, advertising and other information via a communications satellite in geosynchronous orbit and for receiving and processing information relating to local broadcasting of the programs and advertising, a plurality of local radio station downlink affiliate facilities at various locations remote from the uplink facility for receiving satellite transmissions originating at the uplink facility and for locally broadcasting network programs and advertising and local programming, the network uplink facility including means for transmitting both audio, with programs and advertising, and digital databursts at intervals, containing data pertinent to the audio and to the operation of the downlink facilities, up to the satellite, each downlink facility including means for receiving the satellite transmissions from the uplink facility and for converting them into useable form, including means for separating the databursts from the audio, and microprocessor and memory means for receiving, processing and storing the databurst information, correlator means for receiving the actual local broadcast of the downlink radio station and for receiving the network audio program and advertising transmitted from the uplink facility and for comparing them and for noting periods when the local broadcast departs from the network audio and recording such periods of departure, via the microprocessor and memory means, both the downlink and the uplink facilities including modem means for telephone communication between the uplink and the downlink facilities, the uplink facility including a data management computer connected to the uplink facility modem means, and a computer terminal and memory connected to the data management computer, and including data transfer means for initiating connection through the modem means and telephone lines between the downlink microprocessor and the data management computer and for causing the downlink microprocessor and memory means to transfer stored data relating to periods of departure of the downlink broadcast from the network audio, into the data management computer of the uplink facility, and the uplink facility further including automatic billing and payment means associated with the data managment computer for automatically computing bills to advertisers for the local broadcasting of their advertisements and for automatically computing payments due each local station downlink facility for the broadcasting of such advertising, both in accordance with and reflecting said noted periods of departure of each downlink affiliate station from the network audio and whether and to what extent network advertising has been omitted from each local station broadcast.

2. The system of claim 1, wherein the downlink facility further includes means connected to the microprocessor and memory means for presenting some of the databurst information in readable form to a downlink station operator.

3. The system of claim 1, wherein the automatic billing and payment means includes printing means for automatically printing bills to advertisers and checks for payments due each local station downlink facility.

4. The system of claim 1, wherein the uplink facility includes means for transmitting specific access databursts for individually accessing each downlink station separately, for communication with and control of downlink stations individually.

5. The system of claim 1, wherein the correlator means comprises differential amplifier means and zero-crossing detector means, for recognizing points of departure of the local broadcast from the network audio, and points where they again coincide.

6. The system of claim 1, wherein the correlator means comprises first and second integrator means receiving the local broadcast and the network audio signals, respectively, for averaging the signals over a time period which is the same for both integrator means, both integrator means outputting a voltage signal, and means for comparing the two voltage signals to determine correlation or non-correlation and for outputting an output signal indicative thereof.

7. The system of claim 6, wherein the comparing means includes means for substracting the two voltage signals.

8. A radio communication system for broadcasting network programming and broad-based advertising via satellite and remote local stations, comprising:

a network source uplink facility having uplink means for transmitting both audio, including programs and advertising, and coded digital databurst information via communications satellite in geosynchronous orbit, a plurality of remote local radio station affliate downlink facilities, each including downlink receiving means for receiving the network transmissions from the satellite, for separating the coded databurst information from the audio, for decoding the databurst information, and for presenting the network audio in a form useable in the local station broadcast, and including means for using the databurst information in accordance with its informational and directional content, including for downlink control functions, downlink correlating means for receiving the network audio and the local station broadcast and comparing them and determining periods of departure of the local broadcast from the network audio and for generating time-based signals representing said periods of departure, downlink computer means and memory means for receiving the time-based signals from the downlink correlator means and for recording in memory correlation records relating to said periods of departure, downlink modem means associated with the downlink computer means for communicating information over telephone lines, uplink computer means and uplink modem means for communicating with the downlink computer means from time to time via the downlink modem means and receiving information from the downlink computer means, including said correlation records relating to periods of departure, over telephone lines, and data processing means associated with the uplink computer means for computing billing to advertisers and payments to local radio station affiliate downlink facilities for local broadcasting of said broad-based network advertising, based on a comparison of said correlation records with network advertising broadcast by the uplink, relative to each local radio station.

9. The radio communication system of claim 8, wherein the transmitting means includes means for transmitting on a single carrier frequency of sufficient bandwidth to assure adequate audio fidelity and to assure proper databurst integrity.

10. The radio communication system of claim 8, wherein the downlink receiving means includes said downlink computer means and a connected printer, for presenting some of the decoded databurst information in readable form for a downlink affiliate station operator.

11. The radio communication system of claim 8, wherein the uplink facility includes means for transmitting databursts for individually accessing each downlink station separately and for instructing the downlink from time to time via the downlink computer means to telephone the uplink over the modem means and to transfer to the uplink computer means information including said correlation records relating to periods of departure for a selected span of time.

12. The radio communication system of claim 11, wherein said information transferred includes a record of instances of individual accessing of the local affiliate via databursts.

13. The radio communication system of claim 12, wherein the downlink computer means and memory means include occurrence recording means for recording a plurality of types of occurrences at the affiliate downlink facility, including instances of individual accessing of the affiliate downlink by the network via databursts, time synchronization of downlink with network, detection of errors in satellite databurst transmission, detected problems with downlink equipment, and other occurrences including correlation records of the local station's broadcast going "on" the network or "off" the network, all being recorded along with the time of the occurrence, and all being recorded in the memory means in time order as a stream of identified and time-coded occurrences of various types.

14. The radio communication system of claim 13, wherein the downlink and uplink computer means and modem means include means for transferring said stream of identified and time-coded occurrences from the downlink to the uplink computer means, including said correlation records.

15. The radio communication system of claim 14, wherein the recorded time-coded occurrences are in the form of a status code identifying the type of occurrence, and a time code representing the hour of the week, minutes and seconds.

16. The radio communication system of claim 8, further including uplink printer means associated with the uplink computer means and the data processing means for automatically printing bills to the advertisers and checks in payment to the local radio stations.

17. The radio communication system of claim 8, further including downlink defeat means for permitting defeat of network audio by a downlink local station operator at times and for time spans selected by the local station operator.

18. The radio communication system of claim 17, wherein the digital databurst information includes timed cue triggers for cueing and providing a triggering signal usable for automatically activating replacement local programming audio played on the local station's equipment and selected by the local radio station operator to defeat the network audio, and wherein said downlink defeat means includes cue receiving means for receiving and utilizing said cue triggers to automatically defeat the network audio and replace it with the selected local programming at the selected times and for the selected time spans.

19. The radio communication system of claim 8, wherein the uplink transmitting means further includes means for transmitting an optional "network voice" audio to accompany the other network audio, and wherein the downlink radio station facility includes means for receiving said network voice audio and enabling the broadcasting of it with the network audio, and the downlink further including manual network voice defeat means for permitting the local radio station operator to defeat the optional network voice audio whenever desired.

20. The radio communication system of claim 8, wherein the uplink transmitting means includes a digital databurst generator and automator means, both connected to the uplink computer means, for formulating the digital databursts with the selected information to be transmitted, including specific advertiser information entered manually into the automator means, and time and date information.

21. The radio communication system of claim 8, wherein the uplink means includes means for including in the digital databurst information specific coded information for accessing each individual downlink facility separately for functions relating to that facility individually, and wherein the downlink receiving means includes means for utilizing the specific coded information for said functions.

22. The radio communication system of claim 8, wherein the correlating means comprises a pair of integrator means receiving the local and network signals, respectively, and each outputting an averaged voltage signal, means for combining the two signals to obtain a combined-value voltage signal, comparator means for comparing the combined-value signal with a reference voltage, and output means for sending a digital output signal representing either ON LINE, for correlation, or OFF LINE, for non-correlation, to the downlink computer means.

23. The radio communication system of claim 8, wherein the data processing means includes memory means and comparing means associated with the uplink computer means for taking the correlation records of each separate local affiliate downlink facility for a selected period, stored rate information relative to each individual downlink station, stored advertiser information, and a stored schedule of network advertising broadcast by the network uplink in the selected period, and making comparisons and determining what network advertising was broadcast by each local affiliate downlink station during the selected period, calculating the amount payable to the station for the advertising broadcast, and calculating the amount billable to each advertiser for the local broadcasting of its advertising, for the selected period.

24. A local downlink radio station facility for receiving network audio including programming and broad-based advertising, and coded digital databurst information, over satellite from a source network uplink facility, and for broadcasting the programming and advertising to a local audience, comprising:
    downlink receiving means for receiving the network transmissions from the satellite, for separating the coded databurst information from the audio, for decoding the databurst information, and for presenting the network audio in a form useable in the local station broadcast, and including means for using the databurst information in accordance with its informational and directional content, including for downlink control functions, downlink correlating means for receiving the network audio and the local station broadcast and comparing them and determining periods of departure of the local broadcast from the network audio and for generating time-based signals representing said periods of departure, downlink computer means and memory means for receiving the time-based signals from the downlink correlating means and for recording in memory correlation records relating to said periods of departure, and downlink modem means associated with the downlink computer means for communicating information over telephone lines from time to time, to a corresponding modem means and computer means at the network uplink facility, including said correlation records relating to periods of departure, whereby the information communicated to the network uplink facility may be processed by the uplink computer means to compare the correlation records from each of a large number of such local downlink ratio station facilities to a record of network advertising broadcast over satellite by the network uplink, and thereby automatically to compute billing to advertisers and payments to each of the local facilities for their broadcasting of network advertising.

25. The radio communication facility of claim 24, wherein the downlink receiving means includes said downlink computer means and a connected printer, for presenting some of the decoded databurst information in readable form for a downlink affiliate station operator.

26. The radio station facility of claim 24, including means for receiving, utilizing and acting upon satellite-transmitted databursts coded by the network uplink for individual access to the particular local station facility, separately from other local station facilities, for functions relating to the subject local station individually.

27. The radio station facility of claim 24, further including downlink defeat means for permitting defeat of network audio by a downlink local station operator at times and for time spans selected by the local station operator.

28. The radio station facility of claim 24, wherein the digital databurst information from the network uplink includes timed cue triggers signals for cueing and providing a triggering signal usable for automatically activating replacement local programming audio played on the local station's equipment and selected by the local radio station operator to defeat the network audio, and wherein said downlink defeat means includes cue receiving means for receiving and utilizing said cue trigger signals to automatically defeat the network audio and replace it with the selected local programming at the selected times and for the selected time spans.

29. The radio station facility of claim 24, wherein the uplink network transmissions include an optional "network voice" audio to accompany the other network audio, and wherein the downlink radio station facility includes means for receiving said network voice audio and enabling the broadcasting of it with the network audio, and the downlink further including manual network voice defeat means for permitting the local radio station operator to manually defeat the optional network voice audio whenever desired.

30. A method for broadcasting network programming and broad-based advertising via satellite and remote local stations, comprising, providing a network source uplink facility and transmitting therefrom both audio, including programs and advertising, and coded digital databurst information via communications satellite in geosynchronous orbit, providing a plurality of downlink facilities at remote local radio station affliates, with automatic downlink equipment at each, receiving the network transmissions from the satellite at each downlink facility, separating the coded databurst information from the audio, decoding the databurst information with a decoder, presenting the network audio in a form useable in the local station broadcast, and using the databurst information in accordance with its informational and directional content, including use for downlink control functions, receiving the network audio and the local station broadcast in a downlink correlator and comparing them and determining periods of departure of the local broadcast from the network audio, and generating time-based signals representing said periods of departure, receiving the time-based signals from the downlink correlator in a downlink computer means and memory means and recording in memory correlation records relating to said periods of departure, establishing communication from time to time between each downlink computer means and an uplink computer means at the network uplink facility via modem means in each facility over ground-based communication lines, and sending information from the downlink to the uplink, including said correlation records relating to periods of departure, and at the network uplink facility, using the uplink computer means to compute billing to advertisers and payments to local radio station affiliate downlink facilities for local broadcasting of said broad-based network advertising, based on a comparison of said correlation records with network advertising broadcast by the uplink, relative to each local radio station.

31. The method of claim 30, further including transmitting from the uplink facility databursts for individually accessing each downlink station separately and for instructing the downlink from time to time via the downlink computer means to call the uplink via the modem means and to transfer to the uplink computer means information including said correlation records relating to periods of departure for a selected span of time.

32. The method of claim 30, further including transmitting in the digital databurst information from the uplink specific coded information for accessing each individual downlink facility separately for functions relating to that facility individually, and at each downlink utilizing the specific coded information for said funcitons.

* * * * *